United States Patent [19]

Kojima

[11] Patent Number: 5,059,370
[45] Date of Patent: Oct. 22, 1991

[54] INJECTION MOLDING METHOD USING SURGE PRESSURE

[76] Inventor: Hisashi Kojima, No. 2 Nogre Green Coop-Suite 301, 8-1, Noge 2-chome, Setagaya-ku, Tokyo, Japan

[21] Appl. No.: 370,749

[22] Filed: Jun. 20, 1989

[30] Foreign Application Priority Data

Jun. 21, 1988 [JP] Japan .................................. 63-152981

[51] Int. Cl.$^5$ ............................................. B29C 45/77
[52] U.S. Cl. .................................. 264/102; 264/161; 264/328.1
[58] Field of Search ..................... 264/102, 40.5, 328.1, 264/161, 328.8, 328.9, 328.13, 328.7; 425/149, 553, 555, 566, 584, 810

[56] References Cited

U.S. PATENT DOCUMENTS 3,989,436 11/1976 McNeely et al. .................... 425/810
4,879,082 11/1989 Kudo et al. ........................... 425/149

Primary Examiner—Jill L. Heitbrink
Attorney, Agent, or Firm—Wenderoth, Lind & Ponack

[57] ABSTRACT

A surge of high pressure is momentarily applied to a plasticized molding material injected in a mold cavity immediately after the completion of an injection process so that molding shrinkage and orientation which are caused in the material in the mold cavity in the course of solidification of the material on cooling can be substantially eliminated to thereby enable super-precision injection molding.

6 Claims, 2 Drawing Sheets

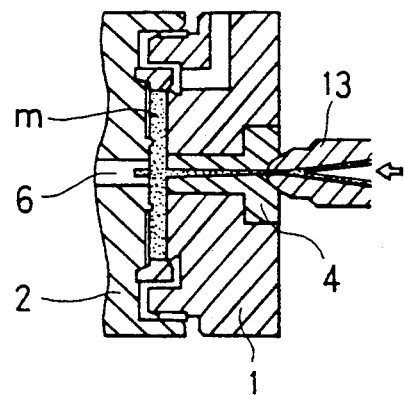 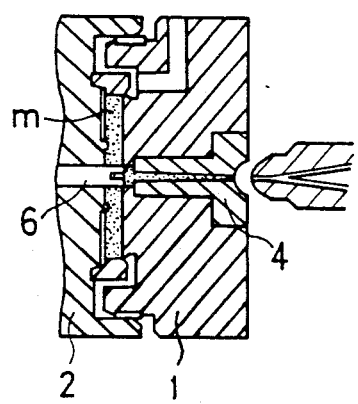 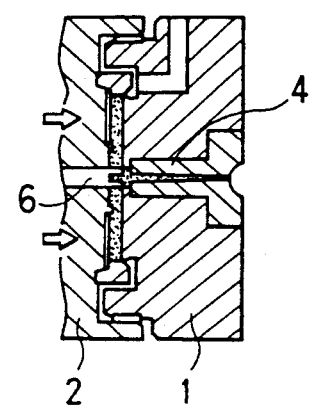
FIG. 2A  FIG. 2B  FIG. 2C
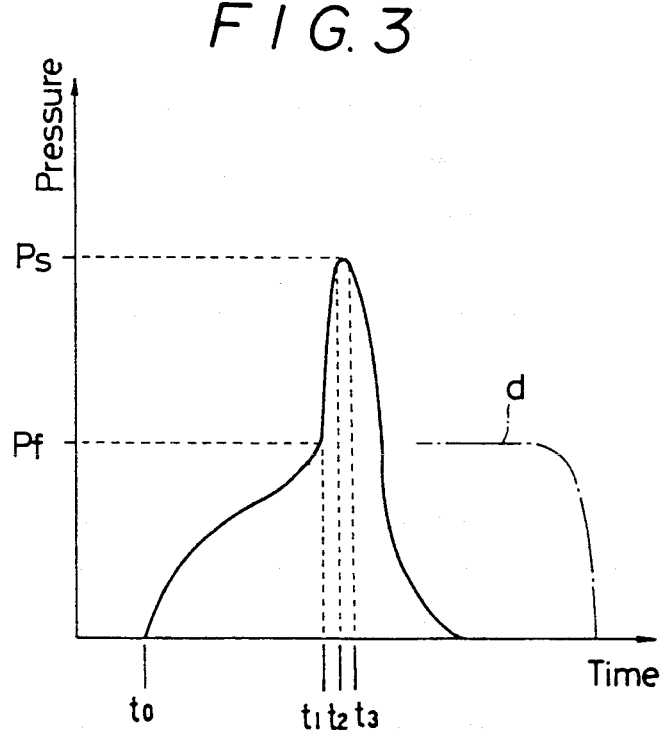
FIG. 3

INJECTION MOLDING METHOD USING SURGE PRESSURE

BACKGROUND OF THE INVENTION

This invention relates to an injection molding method using a surge pressure to be given to a molding material injected into a mold cavity, and more particularly to an injection molding method in which a surge of high pressure is momentarily applied to the plasticized resin material injected into the mold cavity immediately after the completion of a resin filling process so as to suppress molding shrinkage and orientation of the resin material which occur in the course of solidification of the material, to thereby fulfill super-precision molding.

Recently mass-storage memory media such as optical discs and audio compact discs are being increasingly put into practical use. It is undeniable that the development of precision plastic molding techniques for molding such optical discs makes a contribution to the practical application of high-density recording optical discs of high performance. For realization of high-density recording on the optical disc, it is essential to not only finish accurately the optical disc on the submicron order, but also achieve uniform optical characteristics of the optical disc.

Various methods have been developed for precisely molding the high-density recording optical discs. For instance, the inventor of this invention has proposed a basic system for precise injection molding by use of internal die pressure of a molding resin material injected in a mold cavity (Japanese Patent Publication (B2) SHO 58(1983)-52486). In this conventional system, the internal die pressure is continuously monitored and controlled during injection molding in accordance with reference pressure predetermined in a waveform pattern, to thereby produce remarkably precise molded articles.

The inventor further proposed a high-speed injection molding method on the basis of the aforesaid injection molding system in U.S. Pat. No. 4,797,236, in which a molding material is injected in an injection mold under a high vacuum at an ultrahigh speed.

Now, in order to improve the molding precision, molding shrinkage which inevitably occurs in plasticized material injected in the mold cavity in the course of solidification of the material on cooling should be compensated thoroughly. In a compression molding method, "dwelling" is often effected for compensation of the molding shrinkage in the molding material.

One of the compression molding methods has been proposed in U.S. Pat. Application Ser. No. 06/624,968, now U.S. Pat. No. 4,863,651, in which compression pressure to be applied to an injection mold is regulated with mold-clamping force while controlling internal die pressure of the plasticized resin material injected in the mold cavity in conformity with predetermined reference internal die pressure.

These conventional molding methods, however, could not sufficiently respond to the strict requirements imposed on the precision molding. That is, a technical system for thoroughly compensating the molding shrinkage caused in the plasticized resin material on cooling as mentioned above has not been established so far.

To be more specific, the solidified part of the molding material in the mold cavity spreads from the contact surface portion in touch with the inner surface defining the mold cavity toward the inside of the molding material. The molding material molten by heating progresses in solidification of the material even during a short period of resin filling and compression processes. That is to say, since solidification and shrinkage of the molding material within the mold cavity have already started when the compression process has begun to apply compression pressure to the molding material in the mold cavity by means of a mold clamping device, the molding material which is being solidified on cooling is little influenced by the compression pressure after the filling process is finished. Thus, it is preferable to compress the molding material in the mold cavity before the molding material begins to solidify, whereas the application of the compression pressure before solidification of the material will give rise to back-flow of the molding material to an injection part from which the molding material is introduced into the mold cavity.

In addition, the conventional molding methods cannot decrease the directional property resulting in "orientation" remained inside a finished molding, which is caused by subjecting the composition of the molding material to thermodynamic movement during molding. The orientation in the finished molding brings about unevenness in thickness and birefringence of the finished molding. For instance, audio compact discs of 12 cm in diameter and 1.2 mm in thickness actually produced by a conventional injection molding method have by and large an error of about 20 $\mu$m to 30 $\mu$m in thickness and are uneven in birefringence.

SUMMARY OF THE INVENTION

An object of this invention is to provide an injection molding method capable of compensating molding shrinkage in a plasticized molding material injected in the mold cavity of an injection mold, which occurs in the course of solidification of the material on cooling, and suppressing orientation caused in the composition of the molding material due to the directional property, to thereby enable super-precision injection molding.

To attain the above object according to this invention, there is provided an injection molding method which comprises injecting a plasticized molding material into a mold cavity of an injection mold under a high vacuum, and applying a surge pressure to the molding material injected in the mold cavity within 0.01 to 0.05 second simultaneously with or immediately after the completion of injection of the molding material into the mold cavity.

The time in which the surge pressure is applied and magnitude of the surge pressure are determined in accordance with various molding conditions such as the injection speed, resin temperature and capacity of the mold cavity, so that internal stress due to application of the surge pressure is not remained in a finished molding obtained resultantly.

By applying the surge pressure immediately after the completion of injection, variation of the finished molding, such as unevenness in thickness and birefringence of the finished molding can be effectively eliminated.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:-

FIGS. 2A through 2C are explanatory diagrams schematically illustrating a process in which an injection mold is actuated in molding; and FIG. 3 is a diagram schematically showing a typical waveform pattern of internal die pressure.

DESCRIPTION OF THE PREFERRED EMBODIMENTS

Figure 1:
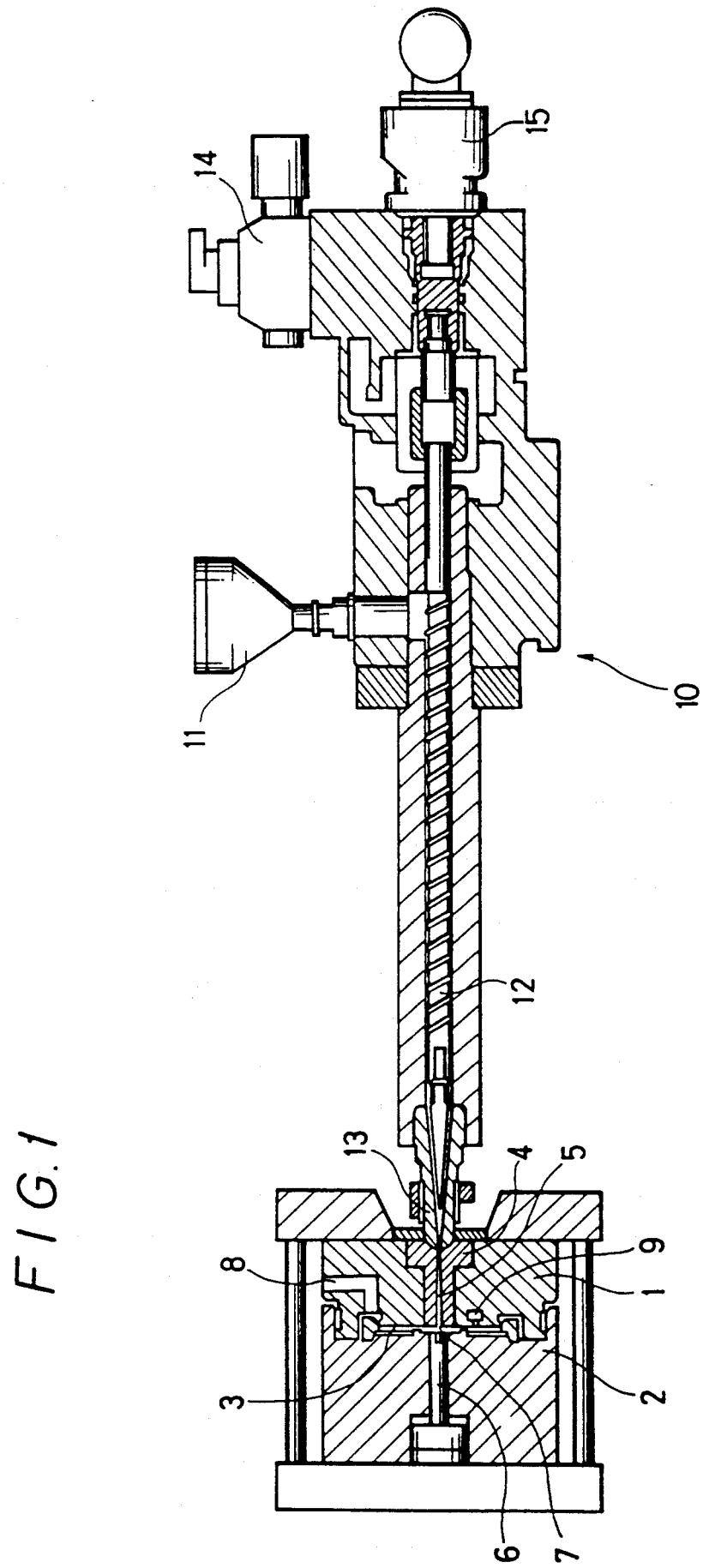
FIG. 1 is a sectional side elevation schematically showing a typical example of an injection molding machine to which the injection molding method according to the present invention is applied.

The injection molding method according to this invention will be described hereinafter with reference to FIG. 1 illustrating an injection molding machine for molding audio compact discs by way of example.

The illustrated injection molding machine comprises a set of stationary die plate 1 and movable die plate 2 between which a mold cavity 3 is formed, a sprue bush 4 having a sprue 5 and fitted in the stationary die plate 1, and a gate-cut pin 6 movably disposed opposite to the sprue bush 4 in the movable die plate 2. At the end portion open to the cavity 3 of the sprue 5 is formed a gate 7. A plasticized molding material is injected into the mold cavity 3 through the sprue 5 and gate 7.

The stationary die plate 1 in this molding machine is provided with a vacuum suction port 8 to which a vacuum pump (not shown) or the like is connected so as to evacuate the mold cavity 3 to a high vacuum of $10^{-1}$ Torr to $10^{-7}$ Torr in a resin filling process. The evacuation to a high vacuum effects to remove a skin layer composed of air or gas attached to the inner surface of the mold cavity 3.

At least one pressure sensor 9 for detecting the pressure (internal die pressure) of the molding material m filled in the mold cavity 3 is disposed inside the stationary die plate 1 or movable die plate 2. Reference numeral 10 denotes an resin injection system for plasticizing and injecting the molding material into the mold cavity 3 via the sprue 5 and gate 7. This injection system 10 comprises a hopper 11 for raw resin granules, a rotary screw 12 for advancing and injecting out of a nozzle head 13 the plasticized molding material obtained by heating the raw resin granules, an injection servo mechanism 14 for regulating the internal die pressure of the molding material filled in the mold cavity 3, and screw driving means 15 for driving the rotary screw 12.

The structure and elements of the injection molding machine are generally known and therefore not described in detail here.

The internal die pressure of the molding material in the mold cavity is detected by the pressure sensor 9 and controlled during the whole molding process on the basis of a predetermined reference internal die pressure by means of the servo system including the servo mechanism 14. In FIG. 3 shows one example of a waveform pattern of the internal die pressure actually detected from the molding material in the mold cavity 3, which varies with time in conformity with the predetermined reference internal die pressure given in a waveform pattern.

In the waveform pattern illustrated, at the time t0 the injection system 10 starts to inject the plasticized molding material m into the mold cavity 3. At the time t1 the mold cavity 3 is completely filled with the molding material m introduced from the injection system 10. That is, the period t0−t1, which is designated as a filling process, is preferably on the order of 0.01 to 0.10 second. By injecting the molding material into the mold cavity in such a short period of time at a high speed, a skin layer of the molding material m which comes in face contact with the inner surface of the mold cavity 3 is not yet solidified entirely at the time of the completion of the filling process. The intermediate part of the molding material m in the mold cavity is of course maintained in the molten state at that time. Thus, such a state that the molding material in the mold cavity is not entirely solidified immediately after the filling process is finished can be accomplished by regulating the conditions such as the temperature of the molding material and injection speed.

Then, at the time t1 a surge of high pressure is applied from the injection system 10 to the molding material m in the mold cavity 3 within 0.01 to 0.05 second. That is to say, the surge pressure is momentarily given to the molding material in the mold cavity 3 at a high speed simultaneously with or immediately after the molding material is completely filled in the mold cavity. At the moment when the surge pressure reaches a maximum at the time t2, the application of the surge pressure is stopped (time t3).

The time t1−t2 for the application of the surge of high pressure depends on the molding conditions such as the cavity capacity, i.e. the size of a finished molded product resultantly obtained and the structure of the mold, whereas surge-application time of 0.01 to 0.10 second is permissible. In other words, the time in which the surge pressure is applied may be determined so that the surge pressure applied can be propagated to all the terminations of the material within the mold cavity, but not remained as internal stress in the finished molded product.

Though the surge pressure Ps to be applied to the molding material in the cavity varies with the molding conditions such as the size of the finished product as described above, it is preferable to increase the surge pressure to the extent of slightly opening the closed mold against clamping force. Specifically, the surge pressure 1.2 to 1.5 times the maximum filling pressure (specific injection pressure) Pf is effective. Though the maximum volume of the molding material filled in the mold cavity when applying the surge pressure generally reaches approximately 120% of that in performing injection molding according to a usual injection molding method in which no such surge pressure is used, the volume of the molding material may be determined to be just 100% when the surge pressure reaches a maximum.

The application of the surge pressure can be readily accomplished by use of a surge supplying system including the injection servo mechanism 14 capable of acting at a high speed and an injection mechanism with low inertia.

The foregoing processes comprise the resin filling process and the surge applying process which are effected within the time t0−t3 in FIG. 3.

The application of the surge pressure is finished at t3 by suspending the surge supplying system and simultaneously thrusting the gate-cut pin 6 toward the sprue bush 4 to perform gate cutting as illustrated in FIG. 2B. The gate cutting has an additional function of preventing an excess of injection pressure from flowing into the mold cavity and can be fulfilled by not only such gate cutting mechanism using the gate-cut pin 6 as illustrated, but also a restricted gate structure.

After the gate cutting as noted above, i.e. immediately after the time t3 in FIG. 3, compression force may be exerted to the material in the mold cavity by momentarily moving the movable die plate 2 toward the stationary die plate 1 as shown in FIG. 2C as performed in a usual compression molding method.

From the time t3 at which the gate cutting is perfomed, the molding material in the mold cavity begins to solidify on cooling to rapidly reduce the internal die pressure of the material. As indicated by the chain line d in FIG. 3, dwelling may be effected after the gate cutting as in the compression molding method. That is, in a dwelling process, the internal die pressure is maintained by operating a clamping mechanism for exerting the clamping force to the molding material in the mold cavity at a pressure nearly equal to the filling pressure (injection pressure) Pf.

As described above, by applying the surge of high pressure to the molding material injected in the mold cavity immediately after the completion of a resin filling process, occurrence of molding shrinkage and orientation of the resin material can be prevented.

Next one example of producing a 12 cm diameter and 1.2 mm thick audio compact disc of polycarbonate plastic by the molding method using a surge of high pressure will be described. When the audio compact discs are molded under conditions of injection time t0−t1 of 0.10 second, surge supplying time t1−t2 of 0.05 second, and maximum surge pressure Ps of about 300 kg/cm$^2$, the following average is obtained as the result of measurement.

Birefringence: 10 to 15 nm
Variation in thickness: 5 μm

Compared with the conventional molding method without using a surge pressure in which average variation in thickness of the compact discs resultantly produced has been more than 20 μm, molding precision is far improved according to the present invention. Besides, the birefringence of the compact disc produced by the method of this invention is decreased to the extent that it can be neglected in an optical system and considered to be substantially uniform.

As is clear from the foregoing, in accordance with the present invention, molding shrinkage and orientation caused in a molding material within a mold cavity in the course of solidification of the material can be eliminated substantially to perfection by applying a surge of high pressure to the material in the mold cavity within 0.01 to 0.05 second simultaneously with or immediately after the completion of injection of the material into the mold cavity. Accordingly, super-precision injection molding of high performance can be fulfilled and provide remarkably high reproductivity of end-products, with the result that not only various types of optical elements such as optical recording discs and optical lenses, but also micromechanical parts having super-fine structure can be molded with high accuracy.

Obviously many modifications and variations of the present invention are possible in the light of the above teachings. It is therefore to be understood that within the scope of the appended claims in the invention may be practiced otherwise than as specifically described.

What is claimed is:

1. An injection molding method comprising evacuating a mold cavity in an injection mold to a high vacuum of $10^{-1}$ Torr to $10^{-7}$ Torr, injecting a plasticized molding material into said mold cavity, momentarily applying a surge pressure of 1.2 to 1.5 times an injection pressure at which the molding material is injected into said mold cavity to the molding material injected in said mold cavity simultaneously with or within 0.01 to 0.05 second immediately after the completion of the injection of the molding material into said mold cavity, and effecting gate cutting immediately after the application of the surge pressure.

2. An injection molding method according to claim 1 wherein a compression pressure is applied to the molding material in said mold cavity immediately after the gate cutting.

3. An injection molding method according to claim 1 wherein a compression pressure is applied to the molding material in said mold cavity immediately after the gate cutting and thereafter maintained in a dwelling process.

4. An injection molding method according to claim 1, wherein the surge pressure is applied for 0.01 to 0.10 second.

5. An injection molding method comprising evacuating a mold cavity inside an injection mold to a high vacuum of $10^{-1}$ Torr to $10^{-7}$ Torr, injecting a plasticized molding material into said mold cavity in accordance with a predetermined internal die pressure given in a waveform pattern, momentarily applying a surge pressure of 1.2 to 1.5 times an injection pressure at which the molding material is injected into said mold cavity to the molding material injected in said mold cavity simultaneously with or within 0.01 to 0.05 second immediately after the completion of the injection of the molding material into said mold cavity so as to prevent the molding material in said mold cavity from solidifying except for a skin layer in touch with an inner surface of said mold cavity, and effecting gate cutting immediately after the application of the surge pressure.

6. An injection molding method according to claim 5, wherein the surge pressure is applied for 0.01 to 0.10 second.

* * * * *